United States Patent
Kothari et al.

(10) Patent No.: US 7,861,219 B2
(45) Date of Patent: Dec. 28, 2010

(54) SCRIPT APPLICATION FRAMEWORK

(75) Inventors: Nikhil Kothari, Sammamish, WA (US); Bertrand Le Roy, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1404 days.

(21) Appl. No.: 11/317,580

(22) Filed: Dec. 23, 2005

(65) Prior Publication Data

US 2007/0061819 A1 Mar. 15, 2007

Related U.S. Application Data

(60) Provisional application No. 60/716,169, filed on Sep. 12, 2005.

(51) Int. Cl.
*G06F 9/44* (2006.01)

(52) U.S. Cl. .................................... 717/108

(58) Field of Classification Search ......... 717/106–115, 717/136, 140, 120, 108; 715/234, 264, 762, 715/769, 212, 841, 207; 719/313; 709/224, 709/227; 706/45–46; 707/102, 792
See application file for complete search history.

(56) References Cited

U.S. PATENT DOCUMENTS

| 5,668,998 | A | 9/1997 | Mason |
| 5,745,675 | A | 4/1998 | Herbig |
| 5,991,877 | A | 11/1999 | Luckenbaugh |
| 6,714,219 | B2 * | 3/2004 | Lindhorst et al. ........... 715/769 |
| 7,555,706 | B2 * | 6/2009 | Chapman et al. ........... 715/234 |
| 2003/0120824 | A1 * | 6/2003 | Shattuck et al. ............. 709/313 |
| 2003/0167277 | A1 * | 9/2003 | Hejlsberg et al. ........... 707/102 |

FOREIGN PATENT DOCUMENTS

| KR | 20040111167 A | 12/2004 |
| KR | 20050039549 A | 4/2005 |

\* cited by examiner

*Primary Examiner*—Tuan Anh Vu
(74) *Attorney, Agent, or Firm*—Workman Nydegger

(57) ABSTRACT

A script application framework is provided to abstract common scripting patterns and to provide a structure for scripting. The script application framework encapsulates scripting logic into script components, manages lifetime of script objects, and builds relationships among different script objects. The script application framework can be applied to any scripting environment.

18 Claims, 1 Drawing Sheet

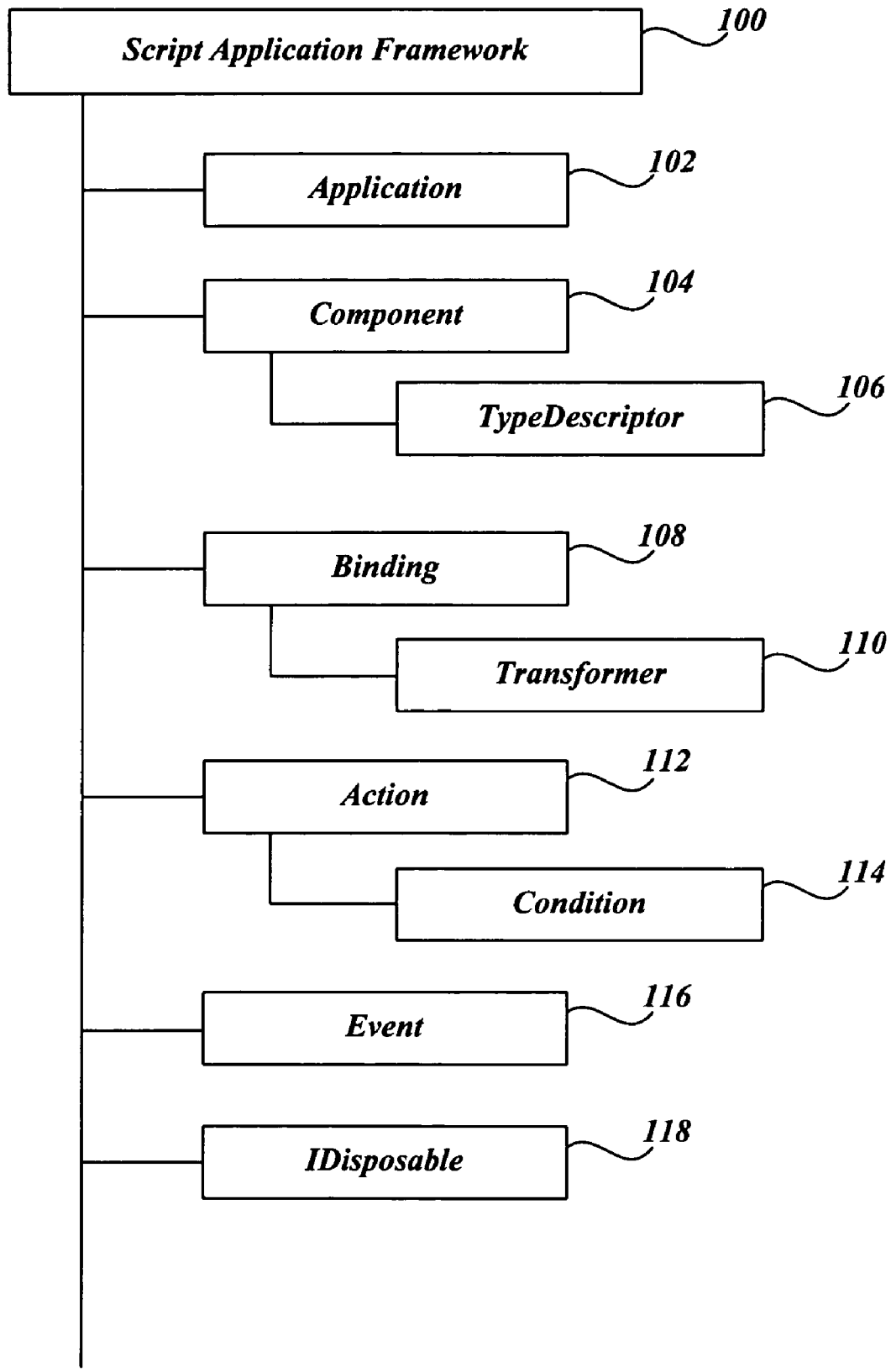

SCRIPT APPLICATION FRAMEWORK

CROSS-REFERENCE TO RELATED APPLICATION

This application claims the benefit of U.S. Provisional Patent Application No. 60/716,169, filed on Sep. 12, 2005, titled "SCRIPT APPLICATION FRAMEWORK," the disclosure of which is hereby expressly incorporated by reference, and the filing date of which is hereby claimed under 35 U.S.C. §119(e).

BACKGROUND

As known by those skilled in the art of computers, a programming language or computer language is a standardized communication tool for expressing instructions to a computer so the computer can execute the instructions, to perform specific acts. Programming languages come in various styles. Some are procedural languages such as C. Some are object oriented, such as C++ and Java. Some are functional such as Haskell. A scripting language tends to be a simple programming language designed for ease of programming and for performing special or limited tasks. For example, nowadays, JavaScript is often used to provide additional functionality and/or interactivity for Web applications. Visual Basic Script, Perl, and TCL are other examples of scripting languages. In general, a scripting language has simpler syntax and fewer programming constructs than a traditional programming language such as C, C++, or Java. In addition, scripting languages do not need to be compiled, and they can be interpreted at run time, though can be executed immediately.

Scripting is the process of using a scripting language to create a set of instructions to achieve a specific function using a scripting language. Unlike traditional programming using programming languages such as C, C++, or Java that manipulate the processes of a computer, scripting tends to involve a fast, smaller set of simple instructions. A script tends to accomplish a specific purpose, such as controlling the process of connecting a computer to another computer via a modem, or controlling how content in a Web page changes according to user input. On the World Wide Web, a scripting language can be used to create scripts to customize or add interactivity to Web pages and Web applications. For example, when inserted into a Web page, a script can control various elements of the Web page, such as the user interface, styles, and HTML markup of the Web page.

Over time, traditional programming has integrated concepts such as abstraction and encapsulation into a programming language and generated programming languages such as C++ and Java that provides predetermined patterns and structures. On the other hand, scripting has remained ad-hoc, involving no patterns or structures and often resulting in error-prone code that is hard to maintain. For example, a scripting environment generally lacks an application framework layer. Scripting thus occurs without any abstractions to hide the complexity of different functionalities and to address common scripting patterns.

While specific disadvantages of existing systems have been illustrated and described in this Background Section, those skilled in the art and others will recognize that the subject matter claimed herein is not limited to any specific implementation for solving any or all of the described disadvantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Aspects of the invention provide a script application framework to ease the development of scripts. The script application framework encapsulates scripting logics into components, provides script object models, binds properties and methods of different script objects, and manages the lifetime of script objects, etc. The script application framework can be applied to any scripting environment.

In accordance with one aspect of the invention, the script application framework may provide an Application class encapsulating common functionalities for a script application. The script application may include a plurality of script objects. The Application class may include functionalities for managing the plurality of script objects.

A Component class may be provided for defining behavior and at least one object attribute associated with a script object. The object attribute may be a property of the script object, a method for the script object, or an event for the script object. Preferably, a TypeDescriptor class is provided for describing object model of the script object.

In accordance with another aspect of the invention, script objects may communicate with each other, through mechanisms such as binding and actions. A Binding class provides functionalities for connecting a first script object with a second script object by transferring data from an object attribute of the first script object to an object attribute of the second script object. Preferably, a Transformer class is used to convert type of the data of the object attribute of the first script object to type of the object attribute of the second script object, when necessary.

Meanwhile, an Action class can be used to invoke a specific action upon occurrence of a specific event in a script object. The specific action can be, for example, to invoke a method of another script object or to configure a property of another script object. An Event class may be used for to maintaining one or more event handlers and signaling an occurrence of an event for a script object. In addition, a Condition class may be used to provide specific criteria for deciding whether to perform the specific action when the specific event occurs.

In addition, the script application framework may further include an IDispose interface that can be implemented for disposing a script object and/or clearing up its relationships to other script objects.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a block diagram illustrating an exemplary script application framework.

DETAILED DESCRIPTION

The following text illustrates and describes exemplary embodiments of the invention. However, those of ordinary skill in the art will appreciate that various changes can be made therein without departing from the spirit and scope of the invention.

FIG. 1 illustrates an exemplary script application framework 100 and its exemplary components. In embodiments of the invention, the script application framework 100 may include more or fewer components than the ones illustrated in FIG. 1.

As shown in FIG. 1, the illustrated script application framework 100 includes an Application 102 class. The Application 102 class is the top-level class that brings together all components of the script application framework 100 and performs tasks such as managing the lifetime of script objects in an application and providing access to services to different parts of the application. In an exemplary embodiment of the invention, an individual Web page includes one instance of the Application 102 class. The following pseudo code illustrates an exemplary Application 102 class:

```
//Application
  Web._Application = function( ) {
    this.get_type = function( );
    this.load = new Web.Event(this);
    this.unload = new Web.Event(this);
    this.findObject = function(id);
    this.getService = function(serviceType);
    this.registerDisposableObject = function(object);
    this.unregisterDisposableObject = function(object);
  }
  Type.registerSealedClass('Web._Application', null, Web.IDisposable,
    Web.ITypeDescriptorProvider, Web.ICustomTypeDescriptor);
  Web.Application = new Web._Application( );
//
```

The Component 104 class is the base class for all script components. The Component 104 class is a mechanism to encapsulate a set of specific functionalities for a script component that can be used by an application developer or by other script components. In exemplary embodiments of the invention, the Component 104 class describes a script object's behavior and object model attributes such as properties, methods, and events. The Component 104 class also may enable a script object to participate in lifetime management of script objects in the application, to raise change notifications when a property of the script object changes, and to manage events specific to the script object. The following pseudo code illustrates an exemplary implementation of the Component 104 class:

```
// Component
  Web.Component = function(registerAsDisposable) {
    this.get_bindings = function( );
    this.get_dataContext = function( );
    this.set_dataContext = function(value);
    this.get_id = function( );
    this.set_id = function(value);
    this.get_isInitialized = function( );
    this.get_isUpdating = function( );
    this.createEvent = function(autoInvoke);
    this.propertyChanged = this.createEvent( );
```

-continued

```
    this.beginUpdate = function( );
    this.dispose = function( );
    this.endUpdate = function( );
    this.getDescriptor = function( );
    this.initialize = function( );
    this.raisePropertyChanged = function(propertyName);
    this.updated = function( );
  }
  Type.registerAbstractClass('Web.Component', null, Web.IDisposable,
    Web.ITypeDescriptorProvider, Web.ISupportBatchedUpdates,
    Web.INotifyPropertyChanged);
//
```

The TypeDescriptor 106 class allows a script object to describe its object model, which includes properties (along with type, and associated attributes), events, and methods (along with associated parameters). For example, the TypeDescriptor object for a TIMER script object may include an Interval property of numerical type and an Enabled property of Boolean type, a Tick event, and methods such as Start( ) and Stop( ). For example, the TypeDescriptor object for an Array script object may provide information on what types of objects are in the array. The following text illustrates an exemplary implementation of the TypeDescriptor 106 class:

```
// TypeDescriptor
  Web.TypeDescriptor = function( ) { }
  Web.TypeDescriptor.prototype.addAttribute = function(attributeName,
    attributeValue);
  Web.TypeDescriptor.prototype.addEvent = function(eventName,
    supportsActions);
  Web.TypeDescriptor.prototype.addMethod = function(methodName,
    associatedParameters);
  Web.TypeDescriptor.prototype.addProperty = function(propertyName,
    propertyType, readOnly);
  Web.TypeDescriptor.addType = function(tagPrefix, tagName, type);
  Web.TypeDescriptor.createParameter = function(parameterName,
    parameterType);
  Web.TypeDescriptor.getType = function(tagPrefix, tagName);
  Web.TypeDescriptor.getTypeDescriptor = function(instance);
  Web.TypeDescriptor.getProperty = function(instance, propertyName,
    key);
  Web.TypeDescriptor.setProperty = function(instance, propertyName,
    value, key);
  Web.TypeDescriptor.invokeMethod = function(instance, methodName,
    parameters);
  Web.TypeDescriptor.getPropertyType = function(instance,
    propertyName, key);
  Web.ICustomTypeDescriptor = function( ) {
    this.getProperty = Function.abstractMethod;
    this.setProperty = Function.abstractMethod;
    this.invokeMethod = Function.abstractMethod;}
  Type.registerInterface('Web.ICustomTypeDescriptor');
  Web.ITypeDescriptorProvider = function( ) {
    this.getDescriptor = Function.abstractMethod;}
  Type.registerInterface('Web.ITypeDescriptorProvider');
//
```

Embodiments of the invention provide one or more mechanisms to connect script objects with each other. FIG. 1 illustrates two such mechanisms: a Binding 108 class and an Action 112 class. The Binding 108 class can be used to transfer data from one object property to another object property, and vice versa. For example, if a script object Counter has a Value property and another script object Label has a Text property. An instance of the Binding 108 class can bind Counter.Value to Label.Text. As a result, the script object Label is able to display Counter.Value. In exemplary embodiments of the invention, an instance of the Binding 108 class may be associated with arbitrary property paths instead of specific property names. For example, Label.Text may be bound to Foo.Bar.Baz, an expression of the referenced script object that is the source of the data for Label.Text. In exemplary embodiments of the invention, data may be allowed to only transfer into a property, to only transfer out of a property to another property, or both, i.e., to be transferred out and into a property.

In embodiments of the invention, the Binding 108 class may be associated with a Transformer 110 class that converts the type of one property into the type of another property. For example, the exemplary Counter.Value is of a numerical type while the exemplary Label.Text is of a string type. Therefore, when a binding between these two properties occurs, an instance of the Transformer 110 class implicitly converts the Counter.Value from the numerical type to the string type, the type of Label.Text.

The following pseudo code illustrates an exemplary implementation of the Binding 106 class:

```
//Binding
    Web.BindingDirection = Web.Enum.create('In', 'Out', 'InOut');
    Web.BindingEventArgs = function(value, direction, targetPropertyType,
    transformerArgument) {
        this.get_direction = function( );
        this.get_targetPropertyType = function( );
        this.get_transformerArgument = function( );
        this.get_value = function( );
        this.set_value = function(value);
    }
    Type.registerSealedClass('Web.BindingEventArgs',
    Web.CancelEventArgs);
    Web.Binding = function( ) {
        this.get_automatic = function( );
        this.set_automatic = function(value);
        this.get_dataContext = function( );
        this.set_dataContext = function(value);
        this.get_dataPath = function( );
        this.set_dataPath = function(value);
        this.get_direction = function( );
        this.set_direction = function(value);
        this.get_property = function( );
        this.set_property = function(value);
        this.get_propertyKey = function( );
        this.set_propertyKey = function(value);
        this.get_transformerArgument = function( );
        this.set_transformerArgument = function(value);
        this.transform = new Web.Event(null);
        this.dispose = function( );
        this.evaluate = function(direction);
        this.evaluateIn = function( );
        this.evaluateOut = function( );
        this.initialize = function(component);
    }
    Type.registerSealedClass('Web.Binding', null, Web.IDisposable,
    Web.ITypeDescriptorProvider);
//
```

Embodiments of the invention may also provide an Event 116 class that may be used to maintain a list of event handlers, and to signal events as they occur. The follow text illustrates an exemplary implementation of the Event 116 class:

```
// Event
    Web.Event = function(owner, autoInvoke) {
        this.get_autoInvoke = function( );
        this.isActive = function( );
        this.get_isInvoked = function( );
        this.dispose = function( );
    }
    Type.registerSealedClass('Web.Event', null, Web.IDisposable);
    Web.Event.prototype.add = function(handler);
```

-continued

```
    Web.Event.prototype.addAction = function(action);
    Web.Event.prototype.remove = function(handler);
    Web.Event.prototype.removeAction = function(action);
    Web.Event.prototype.invoke = function(sender, eventArgs);
    Web.EventArgs = function( ) {
        this.getDescriptor = function( );
    }
    Type.registerClass('Web.EventArgs', null,
    Web.ITypeDescriptorProvider);
    Web.EventArgs.Empty = new Web.EventArgs( );
    Web.CancelEventArgs = function( ) {
        this.get_canceled = function( );
        this.set_canceled = function(value);
    }
    Type.registerClass('Web.CancelEventArgs', Web.EventArgs);
//
```

Another exemplary binding mechanism is provided by the Action 112 class, which allows a specific action to be invoked when a specific event occurs. For example, a script object Timer may include a Counter property and a Tick event. In an exemplary implementation of the script object Timer, whenever the Tick event occurs, an instance of the Action 112 class increments the value of the Counter property. Such an action may be called an InvokeMethod action. Exemplary embodiments of the invention provide multiple types of actions. For example, a SetProperty action may be provided to set the property of a script object to a particular value. In an exemplary embodiment of the invention, the Action 112 class may be further associated with a Condition 114 class that can be used to decide whether to perform an action even though the designated event has occurred. The following text illustrates an exemplary implementation of an IAction interface and the Action 112 class:

```
//Action
    Web.IAction = function( ) {
        this.get_sequence = Function.abstractMethod;
        this.execute = Function.abstractMethod;
        this.setOwner = Function.abstractMethod;
    }
    Type.registerInterface('Web.IAction');
    Web.Action = function( ) {
        this.get_eventArgs = function( );
        this.get_result = function( );
        this.get_sequence = function( );
        this.set_sequence = function(value);
        this.get_sender = function( );
        this.get_target = function( );
        this.set_target = function(value);
        this.execute = function(sender, eventArgs);
        this.performAction = Function.abstractMethod;
        this.setOwner = function(eventSource);
    }
    Type.registerAbstractClass('Web.Action', Web.Component,
    Web.IAction);
    Web.InvokeMethodAction = function( ) {
        this.get_method = function( );
        this.set_method = function(value);
        this.get_parameters = function( );
    }
    Type.registerSealedClass('Web.InvokeMethodAction', Web.Action);
    Web.SetPropertyAction = function( ) {
        this.get_property = function( );
        this.set_property = function(value);
        this.get_propertyKey = function( );
        this.set_propertyKey = function(value);
        this.get_value = function( );
        this.set_value = function(value);
    }
    Type.registerSealedClass('Web.SetPropertyAction', Web.Action);
//
```

In embodiments of the invention, services (data transfer, e.g.) provided by an instance of the Binding 108 class may need to be triggered explicitly or automatically in response to change notifications. Change notifications can be a property change notification or a collection change notification. For example, when the exemplary Counter.Value associated with the script object Timer changes, a property change notification is issued to the corresponding instance of the Binding 108 class, which then updates Label.Text with the current Counter.Value. Collection change notification occurs when a change occurs to a collection script object such as a DataSource. A collection script object includes a collection of data. A DataSource can be, for example, a database. The DataSource may have a Data property. A Repeater script object may have a Data property as well. Assuming Repeater.Data is bounded with DataSource.Data. When new records of data are added to the DataSource.Data, a collection change notification is issued to the corresponding instance of Binding 108 class, which then updates Repeater.Data accordingly. For example, the instance of the Binding 108 class may populate a table of the Repeater with the new data. The following pseudo code illustrates an exemplary implementation of the change notification functionalities:

```
//Change Notification
    Web.INotifyPropertyChanged = function( ) {
        this.propertyChanged = null;
    }
    Type.registerInterface('Web.INotifyPropertyChanged');
    Web.INotifyCollectionChanged = function( ) {this.collectionChanged =
    null;}
    Type.registerInterface('Web.INotifyCollectionChanged');
    Web.PropertyChangedEventArgs = function(propertyName) {
        this.get__propertyName = function( );
    }
    Type.registerSealedClass('Web.PropertyChangedEventArgs',
    Web.EventArgs);
    Web.NotifyCollectionChangedAction = Web.Enum.create('Add',
    'Remove', 'Reset');
    Web.CollectionChangedEventArgs = function(action, changedItem) {
        this.get__action = function( );
        this.get__changedItem = function( );
    }
    Type.registerSealedClass('Web.CollectionChangedEventArgs',
    Web.EventArgs);
//
```

Once script objects reference each other, such as through instances of the Binding 108 class, they create circular references. The IDisposable 118 interface implementation can then be used to break a circular reference. The IDisposable 118 implementation includes logic and mechanism for disposing and cleaning up a script object and its references to other script objects. The following pseudo code illustrates an exemplary implementation of the IDisposable 118 interface:

```
// Web.IDisposable
    Web.IDisposable = function( ) {
        this.dispose = Function.abstractMethod;
    }
    Type.registerInterface('Web.IDisposable');
//
```

In summary, the script application framework 100 encapsulates common scripting logics into components, provides definitions for script objects, and enables script objects to communicate with each other through mechanisms such as binding and actions. The script application framework 100 thus provides a structure for traditionally ad hoc scripting.

It is to be understood that the subject matter defined in the appended claims is not necessarily limited to the specific features or implementations described above. Rather, the specific features and implementations described above are disclosed as example forms of implementing the claims.

The embodiments of the invention in which an exclusive property or privilege is claimed are defined as follows:

1. A computer program product for implementing within a computing system a method for providing an application programming interface ("API") embodied on one or more computer-readable media, the API providing a common script application framework that serves as a platform which can be used to write commands for any common functions found among a plurality of different scripting languages so that writing script commands can be accomplished within the API without having to write the commands in any specific script language, and the commands can then be understood by any script language that uses the common functions contained within the common script application framework, the method comprising:

providing a framework, the framework including a top-level Application class to manage a lifetime of script objects and provide access services to different components of the API, and the framework including a base Component class operating under the context of the top-level Application class to encapsulate functionalities for a script component that can be used by a developer or by other script components and the Component class enabling script objects to participate in management of other script objects and to be notified on a change event regarding a property of another script object;

preparing the top-level Application class which includes script objects for the application which encapsulates a plurality of scripting logics that are common to a plurality of different scripting languages and define the common functionality of the plurality of scripting languages;

encapsulating the plurality of common scripting logics into the Component class that contains a plurality of components which define behavior and one or more object attributes for each script object contained in the Application class; and permitting the script objects to communicate with each other through at least one of a Binding class which enables the script objects which encapsulate the scripting logics to communicate with each other, wherein a first script object is connected with a second script object by transferring data from an object attribute of the first script object to an object attribute of a second script object; or an Action class in which a specific action is invoked in response to a particular event in a script object, the invoked action constituting invoking a method of another script object or configuring a property of another script object in response to the particular event.

2. The computer program product of claim 1, wherein the Component class describes a script object's behavior and object model attributes, the attributes comprising properties, methods, and events.

3. The computer program product of claim 2, wherein the Component class provides a change notification when an object attribute changes.

4. The computer program product of claim 2, wherein the API further comprises a typeDescriptor which describes an object model of the script object.

5. The computer program product of claim 1, wherein the Component class connects at least two of the plurality of script objects.

6. The computer program product of claim 1, further comprising a Transformer class which converts a type of the data of the object attribute of the first script object to a type of the object attribute of the second script object.

7. The computer program product of claim 1, wherein the data is configured to transfer in a direction of the group consisting of:

only into an object attribute of a script object, only out of an object attribute of a script object, and both into and out of an object attribute of a script object.

8. The computer program product of claim 1, wherein the Binding class is triggered in response to a change notification signaling that the object attribute of the first script object has changed.

9. The computer program product of claim 8, wherein the change notification is either a property change notification or a collection change notification.

10. The computer program product of claim 9, wherein the property change notification occurs when the object attribute of the first script object is a property and the value of the property has changed.

11. The computer program product of claim 9, wherein the collection change notification occurs when the first script object is a collection script object, which contains a collection of data, and the object attribute of the first script object is updated.

12. The computer program product of claim 1, further comprising an Event class which maintains one or more event handlers and signaling an occurrence of an event.

13. The computer program product of claim 1, further comprising an Action class which invokes a specific action upon occurrence of a specific event in one of the plurality of script objects.

14. The computer program product of claim 13, wherein the specific action is to invoke another object attribute of the script object, wherein the another object attribute is a method.

15. The computer program product of claim 13, wherein the specific action is to modify another object attribute of the script object.

16. The computer program product of claim 13, further comprising a Condition class which provides a specific criteria to decide whether to perform the specific action when the specific event occurs.

17. The computer program product of claim 1, further comprising an IDisposal class which disposes at least one of the plurality of script objects.

18. One or more storage media storing computer-executable instructions which, when executed by a processor, implement a method for providing an application programming interface (API) which provides a common script application framework that serves as a platform which can be used to write commands for any common functions found among a plurality of different scripting languages so that writing script commands can be accomplished within the API without having to write the commands in any specific script language, and the commands can then be understood by any script language that uses the common functions contained within the common script application framework, the method comprising:

providing a data structure for the common script application framework which is used for encapsulating common scripting logics into components, providing definitions for script object and enabling script objects to communicate with each other through various mechanisms, wherein the common scripting logics are common to a plurality of different scripting languages and define the common functionality of the plurality of scripting languages, the data structure comprising, an Application class which provides an application object which manages a plurality of script objects, manages a lifetime of the plurality of script objects, provides access services to different components of the API, and provides access to services in an application;

a Component class operating under the context of the Application class to encapsulate functionalities for a script component that can be used by a developer or other script component, the Component class being a base class for all script components and defining behavior and at least one object attribute associated with one of the plurality of script objects, the Component class enabling script objects to participate in the management of other script objects and to be notified on a change event regarding a property of another script object;

a TypeDescriptor class which describes an object model of at least one of the plurality of script objects, the object model comprising properties, events, and methods;

a Binding class which enables the script objects which encapsulate the scripting logics to communicate with each other, wherein the Binding Class connects a first script object in the plurality of script objects with a second script object in the plurality of script objects and transfers data from an object attribute of the first script object to an object attribute of the second script object;

a Transformer class which converts a type of the data of the object attribute of the first script object to a type of the object attribute of the second script object;

an Event class which maintains a list of one or more event handlers and signals an occurrence of an event;

an Action class which invokes a specific action upon occurrence of a specific event;

a Condition class which determines according to specific criteria whether to perform the specific action when the specific event occurs; and an IDisposable class which includes logic for disposing of a script object and references to other script objects; and preparing a plurality of scripting commands using the data structure of the common script application framework, the scripting commands being usable by any script language that uses the common functions contained within the common script application framework so that writing the scripting commands can be done without having to write the scripting commands using any particular scripting language.

* * * * *